Figure 4:
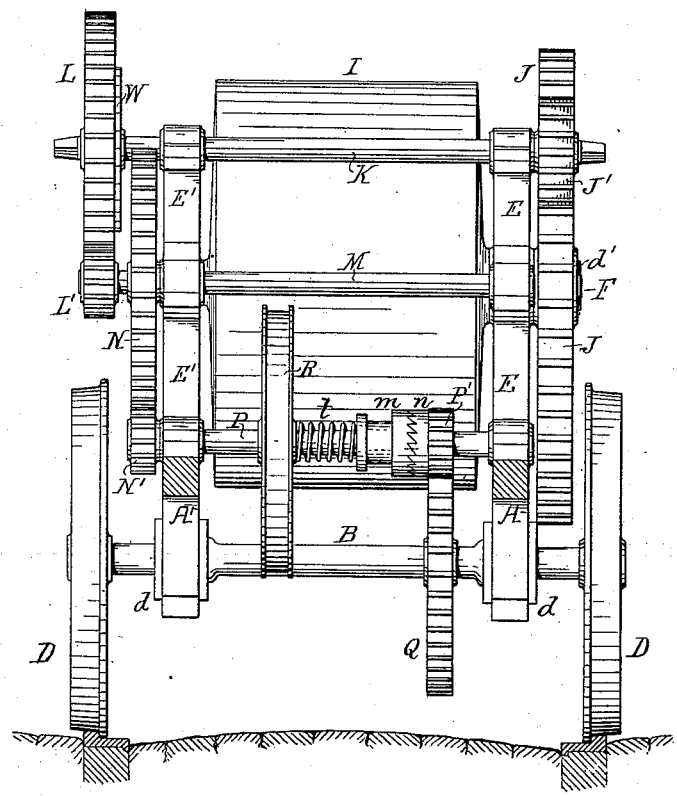

(No Model.) 3 Sheets—Sheet 1.
W. WHARTON, Jr.
MECHANISM FOR CONTROLLING SPRING MOTORS.
No. 301,780. Patented July 8, 1884.
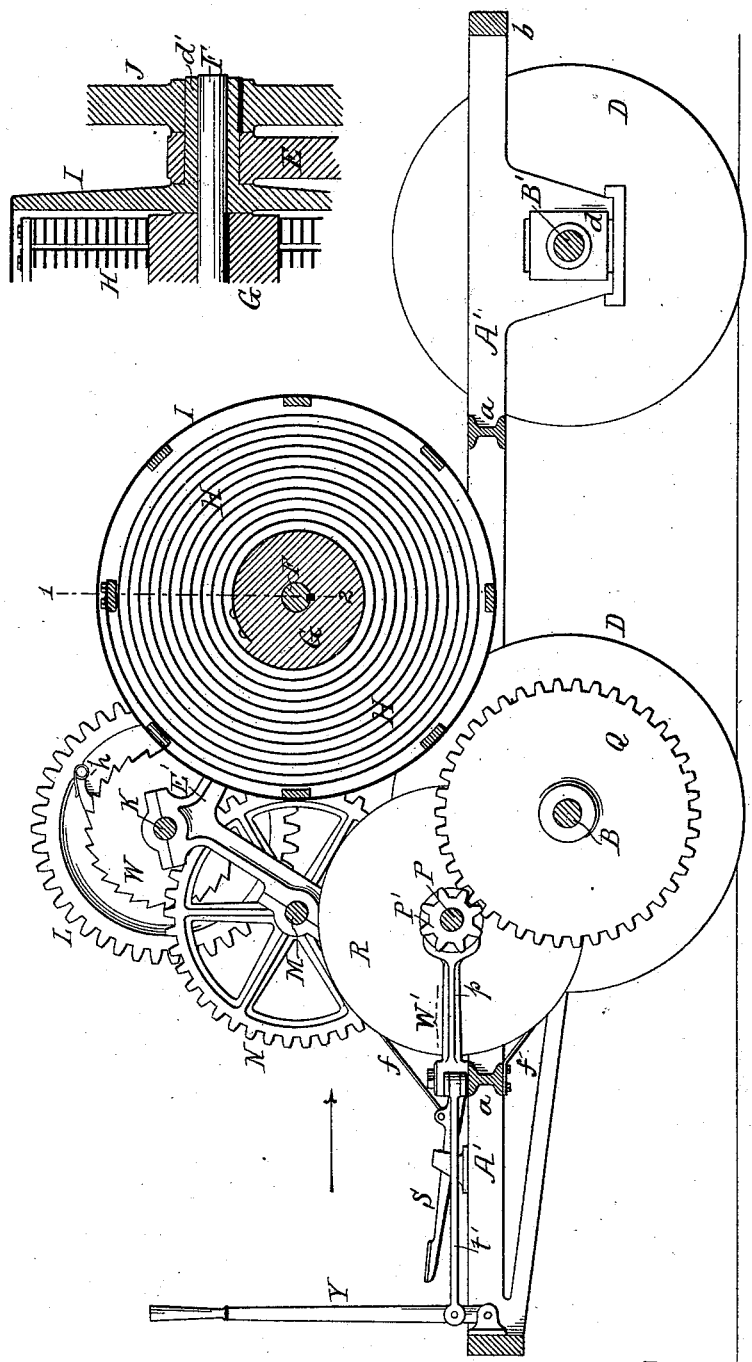
Witnesses:
John M. Clayton
Harry Smith
Inventor:
William Wharton Jr.
by his Attorneys.
Howson & Sons

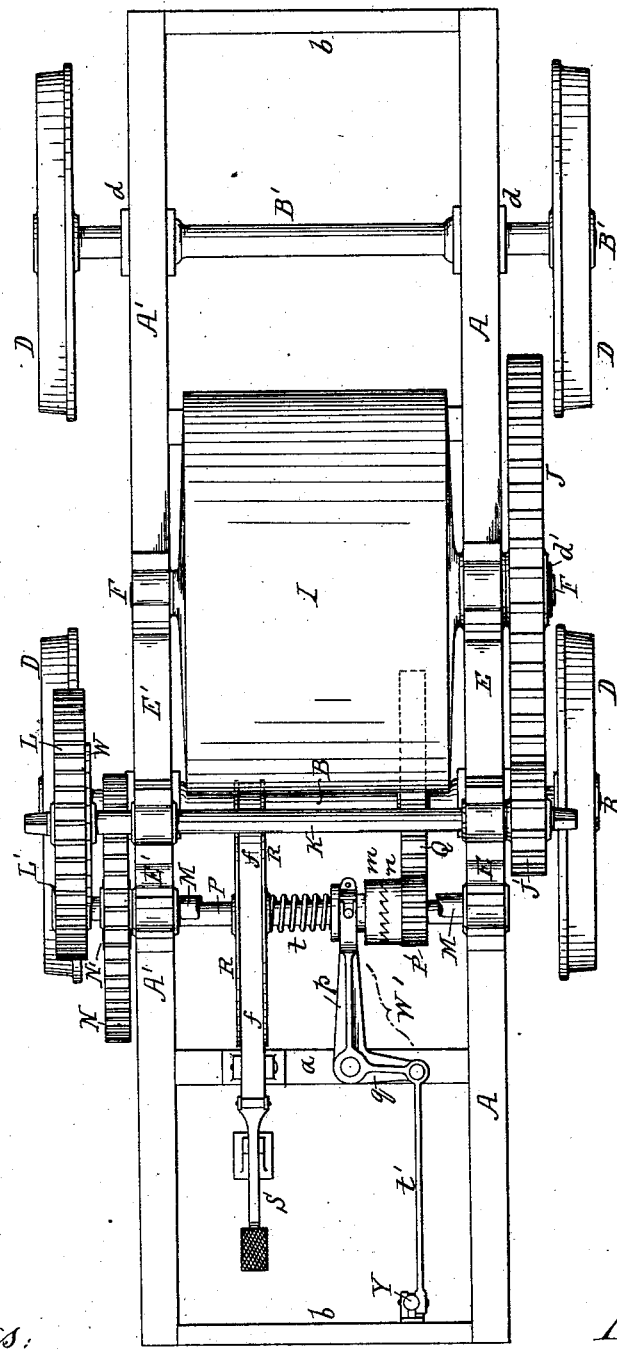

(No Model.)  3 Sheets—Sheet 3.

W. WHARTON, Jr.
MECHANISM FOR CONTROLLING SPRING MOTORS.

No. 301,780.  Patented July 8, 1884.

Witnesses:
John M. Clayton
Harry Smith

Inventor
William Wharton Jr
by his Attorneys
Howson & Sons

UNITED STATES PATENT OFFICE.

WILLIAM WHARTON, JR., OF PHILADELPHIA, PENNSYLVANIA.

MECHANISM FOR CONTROLLING SPRING-MOTORS.

SPECIFICATION forming part of Letters Patent No. 301,780, dated July 8, 1884.

Application filed May 8, 1884. (No model.)

*To all whom it may concern:*

Be it known that I, WILLIAM WHARTON, Jr., a citizen of the United States, and a resident of Philadelphia, Pennsylvania, have invented certain Improvements in Controlling Spring-Motors, of which the following is a specification.

My invention relates to spring-motors combined with multiplying-wheels, through which a shaft or axle is driven at a greater speed than the motor; and the main feature of my invention consists of certain mechanism, fully described and claimed hereinafter, for easily controlling the motor and gearing.

In the accompanying drawings, Figure 1, Sheet 1, is a vertical section illustrating the application of my improved gearing for spring-motors to a railroad-car; Fig. 2, a transverse section of part of Fig. 1 on the line 1 2; Fig. 3, Sheet 2, a plan view of Fig. 1; and Fig. 4, Sheet 3, an end view, looking in the direction of the arrow, Fig. 1.

The frame-work of the car, to which my invention is in the present instance applied, consists of opposite side frames, A A', connected together by cross-pieces $a$ $a$ and end beams, $b$ $b$, the frame being provided with the usual hangers for the boxes $d$ $d$ of the axles B B', which are provided with the usual flanged wheels D.

To the frame-work of the car are secured two side frames, E E', carrying the gearing, which I will proceed to describe.

To a shaft, F, fixed at one end to the frame E', is secured a hub, G, to which are attached the inner ends of a number of helical springs, H, the outer ends of the latter being secured to a drum-cylinder or cage, I, in which the springs are contained, and which has at one end a tubular journal, $d'$, adapted to a bearing in the frame E, as shown in Fig. 2, the shaft F extending through this journal.

The first cog-wheel, J, of the series is secured to the above-mentioned tubular journal $d'$, and gears into a pinion, J', on a shaft, K, which has its bearings in the opposite frames, E E', and which carries a cog-wheel, L, gearing into a pinion, L', on a shaft, M, which also has its bearings in the opposite frames, E E', and which carry a cog-wheel, N, gearing into a pinion, N', on a shaft, P, adapted to bearings on the frame, a pinion, P', gearing into a cog-wheel, Q, on the axle B of the car.

On the shaft P is a brake-wheel, R, a band, $f$, adapted to the latter, being connected at one end to the frame of the car, and connected at the opposite end to a treadle-lever, S, on depressing which the band will be applied to the brake-wheel.

A ratchet-wheel, W, is secured to the shaft K, and the wheel L is loose on the said shaft; but a spring-pawl, $h$, on the said wheel L is adapted to the teeth of the ratchet-wheel, so that by turning the shaft K, and thereby turning the wheel J and barrel I, the springs can be wound up.

It will be seen that from the spring-motor to the shaft M the speed is increased through a system of multiplying-wheels, the increase being in the present instance about twenty-five to one. The speed of this shaft M would be a proper speed for the axle B; but to gear the spring-motor directly to the axle B through the medium of the wheels J J' and L L' would involve this difficulty, that it would be necessary to apply the braking mechanism to the axle, and it would be difficult to devise easily-operated braking appliances to control the power transmitted to the axle; but by causing the wheel N on the shaft M to gear into a pinion, N', on the shaft P, and then applying the braking mechanism to the latter shaft, the controlling of the power will demand comparatively little exertion. But the speed of the shaft P, increased for the purpose of adopting a manageable brake, is greater than that required for the axle; hence the speed is reduced by causing the pinion P' to gear into a wheel, Q, on the said axle. The theory on which this feature of the invention is based will be more readily understood by supposing the brake to be applied to the shaft M, and another brake to be applied to the shaft P, which revolves at a much faster speed than the said shaft M, the power of the spring-motor can be controlled by the brake applied to the shaft P with much less exertion than that required to control the power by a brake applied to the shaft M. This feature of the invention may be further explained by stating that the continuity of the train of multiplying-wheels between the motor and the axle B is interrupted by gearing, and a shaft, to which a speed unnecessarily high for the axle, but necessary for a proper control of the motor, is imparted.

On the shaft P is a clutch, the portion m of which can slide on, but must revolve with, the shaft, the portion n of the clutch, which, in the present instance, forms part of the pinion P', is with the latter loose on the shaft, and a spring, t, tending to maintain the said part m in gear with the part n of the clutch, is interposed between the hub of the brake-wheel and the part m of the clutch. Owing to this clutching mechanism the stoppage of the motor by the application of the brake is not necessarily followed by the abrupt stoppage of the shaft B, the rotation of which, due to any momentum, may continue, the inclination of the teeth of the clutch being such that when the motor is arrested and the shaft B has a tendency to continue its rotation, the part m of the clutch will be self-releasing from the part n, but will be thrown into gear with the latter, however, by the spring t when the motion of the shaft B ceases or when the motor is released.

When my invention has to be applied to a street-car which has to be frequently stopped and started, I use mechanism for operating the part m of the clutch; but it must be such as not to interfere with the automatic action of the same under the circumstances explained above, the mechanism consisting in the present instance of a bell-crank lever, W', combined with a hand-lever, Y. The arm p of the lever W', the latter being pivoted to the frame of the car, has a forked end connected to pins on a two-part ring adapted to a groove on the part m of the clutch, which can act automatically independently of the lever, owing to its groove being wider than the ring. The other arm, q, of the lever is connected by a rod, t', to the above-mentioned lever Y, which is pivoted to the front end of the car-frame.

When the car has to be temporarily arrested, to take on a passenger, for instance, the motor may be stopped by the application of its brake, the part m of the clutch at once thrown out of gear by operating the hand-lever, and the stoppage of the car at any desired point on the track may be brought about by operating the hand-brake, with which every street-car is furnished. Any movement of the car after stopping the motor will not be accompanied with any rattling of one part of the clutch against the other when the part m has been moved away from the part n, as above described; or when the car is descending an inclined plane, and therefore does not require the aid of the spring-motor, the latter may be arrested, and the part m of the clutch may be thrown out of gear and free from contact with the part n, after which the movement of the car may be controlled by the usual hand-brake.

The same mechanism may be used when my invention is applied to the propulsion of a vessel, or any other suitable purpose.

Braking devices other than that described may be used in connection with the spring-motor and its gearing, and different appliances may be used for operating the part m of the clutch.

As regards the self-releasing and self-restoring clutch, it need not be combined with the shaft P, although this is preferred, but may be applied to another shaft of the series; and similar additional clutches may be used when needed in place of the one shown—as, for instance, when it may be desired to throw into gear other wheels than those described, in order to increase or diminish the speed of the axle B, or to reverse the motion of the same, or to bring into action other sets of springs.

I claim as my invention—

1. The combination of a spring-motor, the final shaft or axle to be driven thereby, and a system of multiplying-gear, with a shaft, P, and wheels by which the said shaft P is geared to the multiplying-wheels and to the final shaft or axle, so that it will revolve at greater speed than the final shaft, and with braking mechanism applied to the said shaft P, all substantially as set forth.

2. The combination of a spring-motor and a shaft driven thereby, with braking mechanism for arresting and releasing the motor, and with a self-releasing and self-restoring clutch, substantially as described.

3. The combination of a spring-motor, a shaft driven thereby, braking mechanism for arresting and releasing the motor, and a self-releasing and self-restoring clutch with mechanism, substantially as described, for operating the said clutch without interfering with its automatic action, as set forth.

In testimony whereof I have signed my name to this specification in the presence of two subscribing witnesses.

WILLIAM WHARTON, JR.

Witnesses:
   JOHN M. CLAYTON,
   HENRY HOWSON, Jr.